United States Patent [19]

White

[11] 4,409,681

[45] Oct. 11, 1983

[54] TRANSDUCER

[75] Inventor: Ronald P. White, Amherst, N.H.

[73] Assignee: Sanders Associates, Inc., Nashua, N.H.

[21] Appl. No.: 20,572

[22] Filed: Mar. 15, 1979

[51] Int. Cl.³ .............................................. H04B 13/00

[52] U.S. Cl. .................................... 367/166; 367/155; 367/159; 367/163

[58] Field of Search ............... 367/153, 155, 159, 163, 367/166, 171, 174, 165, 173

[56] References Cited

U.S. PATENT DOCUMENTS

| | | | |
|---|---|---|---|
| 2,384,465 | 9/1945 | Harrison | 367/166 |
| 2,939,106 | 5/1960 | Mason | 367/166 |
| 3,274,537 | 9/1966 | Toulis | 367/163 |
| 3,277,433 | 10/1966 | Toulis | 367/163 |
| 3,284,761 | 11/1966 | Douglas | 367/155 |
| 3,768,069 | 10/1973 | Abbagnaro | 367/171 |
| 3,961,305 | 6/1976 | Green | 367/171 |
| 4,015,233 | 3/1977 | Laurent | 367/165 |
| 4,188,609 | 2/1980 | Mott | 367/166 |

*Primary Examiner*—Harold J. Tudor
*Attorney, Agent, or Firm*—Louis Etlinger; William F. Porter, Jr.

[57] ABSTRACT

An electro-mechanical transducer is disclosed in which a piston-like radiating element is driven by fluid pumped from the interior of a flextensional transducer such that the motion of the flextensional transducer shell is transmitted to the radiating element.

15 Claims, 6 Drawing Figures

TRANSDUCER

FIELD OF THE INVENTION

This invention relates to electro-mechanical transducers and more particularly, to the utilization of a so called flextensional transducer to drive a piston-like radiating element through hydraulic action of the fluid within a fluid-filled flextensional transducer.

BACKGROUND OF THE INVENTION

"Flextensional" transducers such as those illustrated in U.S. Pat. Nos. 3,274,537 and 3,277,433 issued to W. J. Toulis on Sept. 20, 1966 and Oct. 4, 1966, respectively, are known in the art and in general, comprise a shell or housing which is excited by a piezoelectric or ceramic transducer stack driven in a length-expander mode which is placed in compression between opposing interior walls of the shell. The elongation and contraction of the transducer stack imparts a motion to the shell, which in general, radiates or couples energy into a surrounding fluid medium such as water.

In such cases, the medium into which energy is coupled is in contact with the exterior surface of the shell and it is the movement of the exterior surface of the shell which couples energy into the surrounding fluid medium.

While such systems are, in general, eminently satisfactory for the purposes intended, when these devices are utilized at significant ocean depths, it is oftentimes desirable to utilize pressure compensation to eliminate the effects of the increased hydrostatic pressure on the transducer shell, and thus, avoid tensile stress in the piezoelectric stack. It will be appreciated that hydrostatic pressure imparted to the stack can, in some cases, result in impaired transducer characteristics.

In order to eliminate the need for pressure compensating systems in moderate depth applications, and to convert large amplitude flextensional motion to a piston-like motion so as to enable the utilization of flat or cylindrical radiating surfaces, it is possible to utilize the interior surface of the flextensional transducer shell and couple this motion through an internally contained fluid to a piston-like or diaphragm-like surface which has an exposed face in contact with the fluid medium into which energy is to be projected. In reverse, acoustic energy arriving at the transducer through the fluid medium is coupled through the internal fluid to the shell of the flextensional transducer and creates an output voltage from the ceramic or piezoelectric transducer stack proportional to the magnitude of the signal.

In one embodiment, the subject transducer utilizes a flextensional transducer sealed at one end. The opposite end of the transducer is coupled to a chamber sealed at one end with a flat or cylindrical radiating surface, and the entire unit is filled with fluid such as oil.

In the transmit mode, as the flextensional transducer shell flexes, the internal fluid transmits the motion of the interior surfaces of the flextensional transducer into motion of the flat or cylindrical radiating surface, which, in turn, projects the acoustic energy into the surrounding fluid medium.

This type of transducer can be utilized for a frequency band about the resonance of the flextensional transducer, or with increased bandwidth about a region below the flextensional resonance. In an alternative embodiment, increased deflection of the exterior radiating surface can be achieved by adding flextensional modules as the prime drive mechanism, with the flextensional modules being driven in parallel. In this embodiment the flextensional transducer opens up into a large chamber which supports an increased radiating surface.

The subject transducer eliminates the need for pressure compensation and results in improved aging under storage conditions, in that there is no requirement for prestressing the ceramic stack. As a result of hydrostatic compression of the ceramic stack there is an extended depth capability because the internal fluid is at ambient pressure. Moreover, since ceramic prestress increases with depth, in contrast to decreasing prestress for air backed designs, the shelf life is not effected by long term application of relatively high stress levels. Shell creep is also a non-issue in this design.

In summary, the subject system involves the utilization of an "inverse" flextensional transducer in the sense that it is the interior surface of the flextensional transducer shell the motions of which produce the radiation of acoustic energy.

The advantages of this configuration are that it eliminates the need for pressure compensation or complaint tubebacking; results in improved againg characteristics for ceramic stack and shell creep; results in extended depth capabilities; and provides that stress increase in ceramic with depth rather than decrease as in air-backed designs. The design also results in radiation loading determined by exterior surfaces and potential improved bandwidth and volume velocity within a constrained radiating surface. There is, of course, greater reliability through the utilization of a self-contained unit and it should be noted that the ceramic is in direct contact with a cooling agent. Finally, new shell materials are practical for lower frequencies without introducing heat transfer problems.

It is, therefore, an object of this invention to provide an improved electro-mechanical transducer.

It is another object of this invention to provide an inverse drive flextensional transducer which incorporates all of the above advantages.

It is another object of this invention to provide a method for utilizing a flextensional transducer so that the internal surface of its shell is utilized as the prime drive mechanism.

These and other objects will be better understood when taken in connection with the detailed description and the drawings appended hereto wherein:

DETAILED DESCRIPTION

Figure 1:
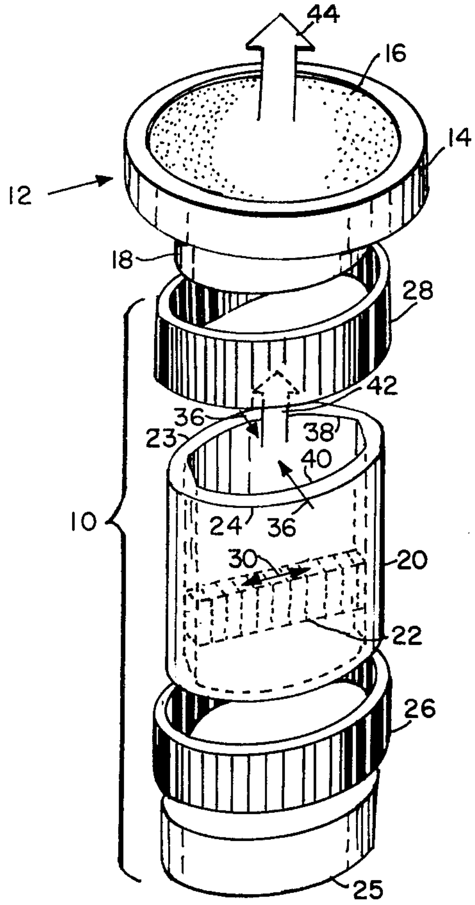
FIG. 1 is an exploded view of the subject transducer, illustrating the movement of the drive element, the flexure of the walls of the shell of the flextensional transducer, the pumping of the fluid and the resultant motion of the radiating element.

Referring now to FIG. 1, the subject transducer, in general, includes a flextensional transducing unit 10 and a radiating head 12, which includes, in general, a chamber 14, a piston-like radiating element 16, which may be in the form of a flat flexible diaphragm, and a connecting sleeve 18. The flextensional transducing unit, in this embodiment, includes a hollow shell 20 with an oval-shaped cross section and a piezoelectric ceramic stack driving element 22 which is bonded in place between opposing interior walls of shell 20. The piezoelectric stack is positioned by initially inwardly flexing opposing major walls 23 and 24, inserting the piezoelectric stack and releasing the walls. The bottom of the shell is sealed by a bottom member 25 which is secured to the shell by an elastomer boot 26.

Chamber 12 is secured to the opposite end of the flextensional transducer shell by a similar boot 28. The flextensional transducer shell and the entire chamber are filled with a working fluid which, in general, may be silicone oil such as Dow Corning 200 centistroke, depending on the particular characteristics desired and the compressability of the fluid.

In operation, when the piezoelectric stack is energized such that the stack extends as illustrated by double-ended arrow 30, opposing major walls 23 and 24 of shell 20 move inwardly as indicated by arrows 36. Interior wall surface 38 and 40 of the shell move inwardly so as to produce a pumping action in which the fluid is pumped in the direction of arrow 42. The motion of the oil thereafter imparts a motion to radiating element 16 as illustrated by arrow 44 by virtue of its communication with the side of the radiating element not in contact with the surrounding fluid medium.

Figure 2:
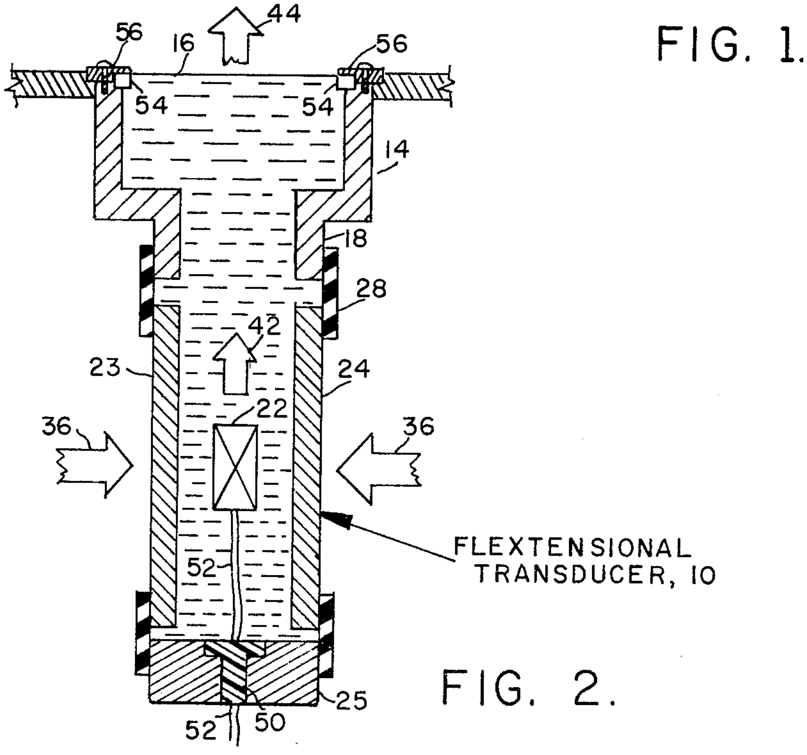
FIG. 2 is a sectional diagram of the assembled transducer of FIG. 1.

This operation is also illustrated in connection with FIG. 2 in which an assembled transducer is shown and in which corresponding elements between the two figures carry corresponding reference characters.

As can be seen, end piece 25 may be provided with a sealing type plug 50 through which connecting wires or cables 52 pass so as to permit electrical connection to the piezoelectric or ceramic stack 22.

Alternatively, acoustic energy in the surrounding fluid medium may be converted into electrical signals by the piezoelectric stack and transmitted from the transducer over cables 52.

With respect to the radiating element, this element may be made of neoprene rubber or may be any material such as a thin metallic disc. In general, when utilizing a flexible material, it is anchored at its periphery by a mounting system involving an inner ring 54 secured to the diaphragm, and an outer clamping ring 56 which may be secured to chamber 14 in any suitable manner.

Figure 3:
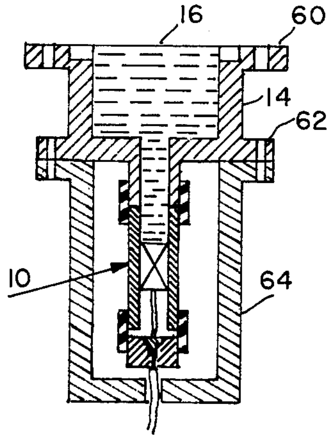
FIG. 3 illustrates an alternative mounting system for the flextensional transducer with an exterior protective housing.

It will be appreciated that the flat, radiating surface is primarily used in hull-mounted configurations in which the transducer is exposed through the hull of a surface vessel or sub-surface vehicle and in which the radiating surface is flush with the exterior hull surface. As with all planar radiating surfaces, the directionality of the unit is governed by this radiating surface and baffling effects of the vehicle body. A convenient mounting system is shown in FIG. 3, again with corresponding elements utilizing corresponding reference characters vis-a-vis FIGS. 1 and 2. In this embodiment, chamber 14 is provided with flanges 60 and 62, such that the transducer may be conveniently mounted to the hull of the vessel. A protective housing 64 may be secured about the flextensional transducer portion 10 as illustrated.

Figure 4:
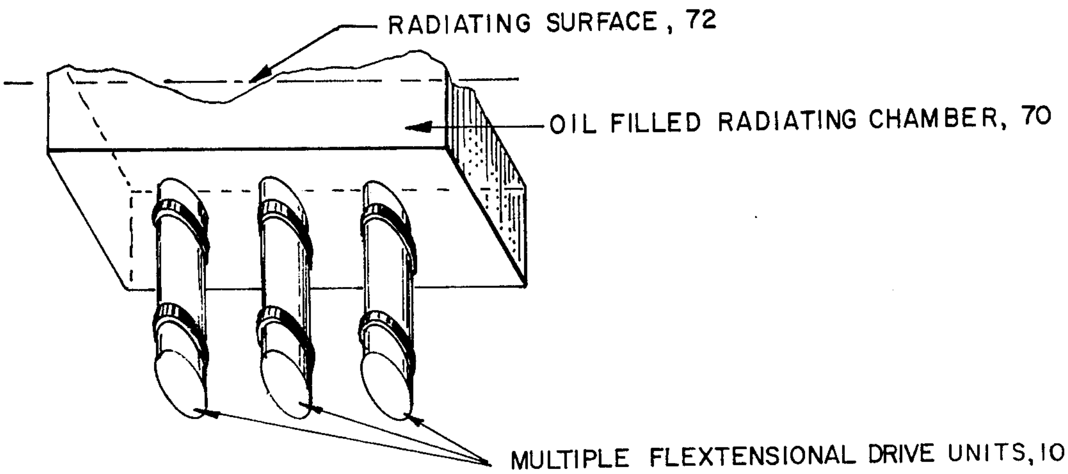
FIG. 4 is a diagrammatic illustration showing the utilization of multiple flextensional drive units coupled to a fluid filled radiating chamber.

Referring to FIG. 4, multiple flextensional drive units 10 may be coupled to a single fluid filled radiating chamber 70 which has an extended radiating surface 72. When the flextensional drive units are driven in parallel, the output power for the subject transducer may be increased proportionally.

Figure 5:
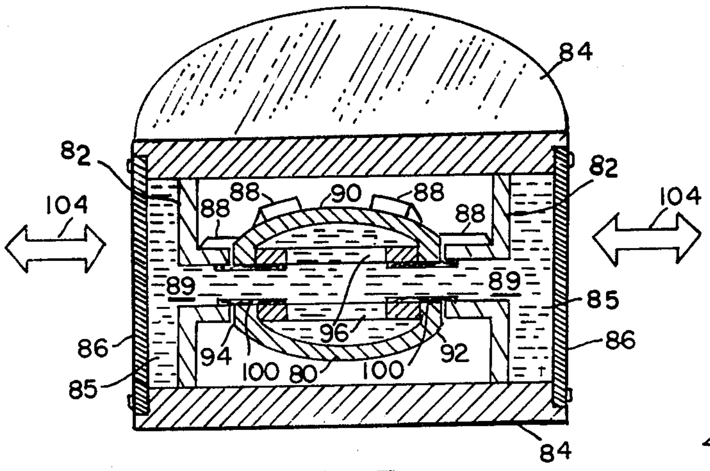
FIG. 5 illustrates an alternative cylindrical embodiment, in which the flextensional is in the form of opposing domes driven by a pair of ceramic ring elements and in which the operating fluid is pumped from the interior of the shell through spoke-like channels to a cylindrical radiating element; and, FIG. 6 is a diagrammatic view of the flextensional transducer shell for use in the configuration of FIG. 5.

While flat radiating surfaces may be desired in some applications, cylindrical radiating surfaces may be provided by utilizing a so-called clam shell-configured flextensional transducer, the fluids pumped thereby being provided to an annular chamber having a cylindrical radiating element. This configuration is illustrated in FIG. 5 in which the clam shell transducer 80 is located interiorally of an annular cylindrical chamber formed by an inner wall 82, circular end pieces 84, and a cylindrical radiating element 86 which connects and seals the two end pieces. The annular chamber is illustrated by reference character 85.

The flextensional transducer is located as a central hub and is connected to annular chamber 85 via spoke-like inward projections 88 located along wall 82. As illustrated, and projections have central fluid passageways 89.

Figure 6:
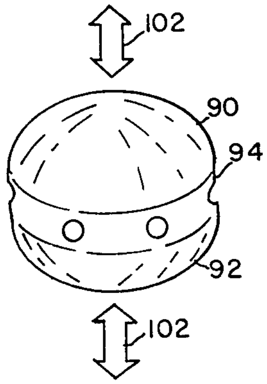

In terms of the configuration of the flextensional transducer, the shell is comprised of two domes 90 and 92, joined by an annular appertured ring portion 94. Its configuration in prospective is illustrated in FIG. 6. Referring again to FIG. 5, a pair of ring shaped ceramic or piezoelectric elements 96 are positioned to either side of the central longitudinal axis of the transducer and in one embodiment the entire flextensional transducer is resiliently mounted to projections 88 via resilient tubes 100.

In operation, with the flexure of the hemispheric domes as illustrated by arrows 102 in FIG. 6, fluid is pumped from the central hub structure through the spokes into the annular chamber, thereby producing flexure of the cylindrical radiating element 86 as illustrated by double ended arrows 104.

In summary, utilization of the flextensional transducer to drive other types of radiating heads through hydraulic linkages offers many advantages. In flextensional transducers energy is first transmitted to a shell which is driven a flexural mode of vibration by electrical signals which cause the ceramic or piezoelectric stack to expand and contract along its major axis, forcing the shell to change its eccentricity, alternately becoming longer and shorter. As a result, the large curved sides of the shell pulsate inward and outward producing acoustic radiation. It will be appreciated that the advantage of utilizing the flextensional transducer as a drive, is that the flexing surface of the shell is much larger than that of the ceramic stack, which is driving the element. This area ratio produces an impedance transformation factor which allows a better impedance match between the ceramic stack and ultimately the water. It will be appreciated another advantage of utilizing a flextensional drive unit is that the amplitude of vibration of the shell is greater than that of the ceramic stack. In combination, these two factors produce an impedance match between the ceramic and the water via the oil and diaphragm coupling, which results in high-power transfer and wide bandwidth.

Although preferred embodiments of the invention have been described in considerable detail for illustrative purposes, many modifications will occur to those skilled in the art. It is therefore desired that the protection afforded by Letters Patent be limited only by the true scope of the appended claims.

I claim:

1. Apparatus for driving an element that has piston-like motion, said apparatus comprising:

a flextensional transducer having a hollow shell with interior side walls; and fluid drive means including fluid communicating with said interior side walls and one side of said piston-like radiating element.

2. A transducing apparatus contained within a surrounding fluid medium said apparatus comprising:

a flextensional transducer having a hollow shell with interior side walls;

a radiating element including a fluid chamber which couples the interior motion of said flextensional transducer to an outside medium;

means communicating with the interiors of said chamber and said shell for providing a fluid-tight connection between said shell and said chamber; and fluid filling said chamber, shell and connection means.

3. A method of producing acoustic radiation in a surrounding fluid medium comprising the steps of:

driving a piston-like radiating member with fluid pumped to it from a fluid filled flextensional transducer.

4. Transducing apparatus comprising:

a number of individual flextensional transducer units, each having a hollow shell with interior side walls;

a radiating element including a chamber and a piston-like member located at one end of the chamber;

means communicating with the interiors of said chamber and each of said shells for providing a fluid-tight connection between said shell and said chamber; and fluid filling said chamber, shells and connection means.

5. The transducer of claim 4, and further including means for driving each of said flextensional transducer units in parallel.

6. A transducer apparatus for converting flexural volume velocity flow to acoustic radiation comprising:

A. a fluid filled flextensional transducer having a hollow shell which contains said fluid, said fluid being acoustically coupled to an outside medium and to the inner wall of said shell; the outer wall of said shell being acoustically decoupled from said medium to prevent contact between the outer wall of said shell and said medium;

B. means for coupling the flexural vibrations of the inner wall of said shell of said flextensional transducer to said outside medium; and C. a driving element mounted between the inner walls of said shell, whereby the desirable frequency characteristics of said flextensional transducer are utilized and the radiating area of said transducer is determined by the size of said coupling means.

7. The apparatus claimed in claim 6 wherein the outer wall of said shell is acoustically decoupled by being enclosed in a protective chamber.

8. The apparatus claimed in claim 6 wherein the outer wall of said shell is acoustically decoupled by being mounted on the hull of a ship.

9. The apparatus claimed in claim 6 wherein said means is a piston.

10. The apparatus claimed in claim 9 wherein the radiating area of said apparatus is increased by increasing the size of said piston.

11. The apparatus claimed in claim 6 wherein said means is a diaphragm.

12. The apparatus claimed in claim 11 wherein the radiating area of said apparatus is increased by increasing the size of said diaphragm.

13. The apparatus claimed in claim 6 wherein said driving element is a piezoelectric stack.

14. The apparatus as claimed in claim 6, the inner wall of said shell having a major axis and a minor axis, wherein said driving element is mounted along said major axis of said wall.

15. The apparatus claimed in claim 6, the inner wall of said shell having a major axis and a minor axis, wherein said driving element is mounted along said minor axis of said wall.

* * * * *